(12) United States Patent
Yang et al.

(10) Patent No.: US 10,945,132 B2
(45) Date of Patent: Mar. 9, 2021

(54) APPARATUS, METHOD AND COMPUTER PROGRAM PRODUCT FOR PRIVACY PROTECTION

(71) Applicant: Nokia Technologies Oy, Espoo (FI)

(72) Inventors: Yunjuan Yang, Hami (CN); Ye Tian, Beijing (CN); Zheng Song, Shandong (CN); Wendong Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 15/772,921

(22) PCT Filed: Nov. 3, 2015

(86) PCT No.: PCT/CN2015/093646
§ 371 (c)(1),
(2) Date: May 2, 2018

(87) PCT Pub. No.: WO2017/075755
PCT Pub. Date: May 11, 2017

(65) Prior Publication Data
US 2018/0316651 A1   Nov. 1, 2018

(51) Int. Cl.
*H04W 12/12* (2009.01)
*H04L 9/08* (2006.01)
(Continued)

(52) U.S. Cl.
CPC ......... *H04W 12/1201* (2019.01); *H04L 9/088* (2013.01); *H04L 9/0894* (2013.01);
(Continued)

(58) Field of Classification Search
None
See application file for complete search history.

(56) References Cited

U.S. PATENT DOCUMENTS

| 7,903,571 B1 | 3/2011 | Herington |
| 2010/0017870 A1 | 1/2010 | Kargupta |

(Continued)

FOREIGN PATENT DOCUMENTS

| CN | 102196431 A | 9/2011 |
| CN | 103491535 A | 1/2014 |

(Continued)

OTHER PUBLICATIONS

Castelluccia, Claude; et al. "Efficient and Provably Secure Aggregation of Encrypted Data in Wireless Sensor Networks" [online], May 1, 2015 [retrieved Nov. 11, 2019], Retrieved from the Internet: https://dl.acm.org/citation.cfm?id=1525858 (Year: 2015).*

(Continued)

*Primary Examiner* — Taghi T Arani
*Assistant Examiner* — Joshua Raymond White
(74) *Attorney, Agent, or Firm* — Harrington & Smith

(57) ABSTRACT

Method, apparatus, computer program product and computer readable medium are disclosed for privacy protection. A method may comprise: receiving encrypted data from a top participating node of a participant chain, which comprises a plurality of participating nodes; and decrypting the encrypted data, wherein the encrypted data comprise a plurality of encrypted sensory data obtained respectively by said plurality of participating nodes.

9 Claims, 7 Drawing Sheets

(51) Int. Cl.
*H04L 29/06* (2006.01)
*H04W 12/00* (2009.01)
*H04L 29/08* (2006.01)
*H04W 4/70* (2018.01)
*H04W 84/18* (2009.01)

(52) U.S. Cl.
CPC ...... *H04L 63/0464* (2013.01); *H04L 63/0478* (2013.01); *H04W 12/0013* (2019.01); *H04W 12/1202* (2019.01); *H04L 67/12* (2013.01); *H04W 4/70* (2018.02); *H04W 84/18* (2013.01)

(56) References Cited

U.S. PATENT DOCUMENTS

| | | | | |
|---|---|---|---|---|
| 2010/0135494 | A1* | 6/2010 | Armknecht | H04L 63/06 380/270 |
| 2012/0204026 | A1 | 8/2012 | Shi et al. | |
| 2013/0194928 | A1* | 8/2013 | Iqbal | H04L 47/70 370/235 |
| 2014/0304519 | A1* | 10/2014 | Gorecki | H04L 63/0421 713/176 |
| 2015/0254463 | A1 | 9/2015 | Ryhorchuk et al. | |
| 2017/0013047 | A1* | 1/2017 | Hubbard | H04L 67/10 |
| 2017/0149563 | A1* | 5/2017 | Camenisch | H04L 9/0866 |

FOREIGN PATENT DOCUMENTS

| | | | | |
|---|---|---|---|---|
| CN | 104380653 | A | | 2/2015 |
| CN | 104717644 | A | | 6/2015 |
| WO | 2013/158798 | A2 | | 10/2013 |
| WO | WO-2013181841 | A1 | * | 12/2013 ......... G06F 21/6254 |

OTHER PUBLICATIONS

Du et al. "A Practical Approach to Solve Secure Multi-party Computation Problems" [online] Syracuse University, Sep. 2002. [retrieved on May 12, 2020]. Retrieved from the internet: URL: http://www.cis.syr.edu/~wedu/Research/paper/nspw2002.pdf (Year: 2002).*

Kliazovich et al. "Packet Concatenation at the IP level for performance enhancement in wireless local area networks" [online] Springer Science, Aug. 2008. [retrieved on May 12, 2020]. Retrieved from the internet: URL: https://link.springer.com/content/pdf/10.1007/s11276-006-0734-6.pdf (Year: 2008).*

Castelluccia et al. "Efficient and Provably Secure Aggregation of Encrypted Data in Wireless Sensors Networks" [online] Jun. 2009. [retrieved on May 12, 2020]. Retrieved from the internet: URL: https://dl.acm.org/doi/pdf/10.1145/1525856.1525858 (Year: 2009).*

Rahman et al., "An Adaptive Path Hiding Technique for Participatory Sensing Networks", Future Generation Computer Systems, Apr. 2014, pp. 1-12.

Gao et al., "TrPF: A Trajectory Privacy-Preserving Framework for Participatory Sensing", IEEE Transactions on Information Forensics and Security, vol. 8, No. 6, Jun. 2013, 14 pages.

Cristofaro et al., "Extended Capabilities for a Privacy-Enhanced Participatory Sensing Infrastructure (PEPSI)", IEEE Transactions on Information Forensics and Security, vol. 8, No. 12, Dec. 2013, pp. 2021-2033.

Boutsis et al., "Privacy Preservation for Participatory Sensing Data", IEEE International Conference on Pervasive Computing and Communications (PerCom), Mar. 18-22, 2013, pp. 103-113.

Ganti et al., "PoolView: Stream Privacy for Grassroots Participatory Sensing", SenSys '08 Proceedings of the 6th ACM conference on Embedded network sensor systems, Nov. 5-7, 2008, pp. 281-294.

Mun et al., "PEIR, the Personal Environmental Impact Report, as a Platform for Participatory Sensing Systems Research", MobiSys '09 Proceedings of the 7th international conference on Mobile systems, applications, and services, Jun. 22-25, 2009, pp. 55-68.

Shin et al., "AnonySense: A System for Anonymous Opportunistic Sensing", Pervasive and Mobile Computing, vol. 7, No. 1, Feb. 2011, pp. 16-30.

Wang et al., "ARTSense: Anonymous Reputation and Trust in Participatory Sensing", Proceedings IEEE INFOCOM, Apr. 14-19, 2013, pp. 2617-2625.

Christin, "Privacy in Participatory Sensing—User-Controlled Privacy-Preserving Solutions for Mobile Sensing Applications", Thesis, 2013, 152 pages.

International Search Report and Written Opinion received for corresponding Patent Cooperation Treaty Application No. PCT/CN2015/093646, dated Jul. 26, 2016, 12 pages.

Extended European Search Report received for corresponding European Patent Application No. 15907597.7, dated Mar. 13, 2019, 8 pages.

Castelluccia et al., "Efficient and Provably Secure Aggregation of Encrypted Data in Wireless Sensor Networks", ACM Transactions on Sensor Networks, vol. 5, No. 3, May 2009, pp. 1-36.

Du et al., "A Practical Approach to Solve Secure Multi-party Computation Problems", Proceedings of the 2002 workshop on New security paradigms, Sep. 23-26, 2002, pp. 127-135.

Zhang et al., "A Novel Privacy Protection Scheme for Participatory Sensing with Incentives", IEEE 2nd International Conference on Cloud Computing and Intelligence Systems, Oct. 30-Nov. 1, 2012, pp. 1017-1021.

Xu et al., "Incentive Mechanisms for Time Window Dependent Tasks in Mobile Crowdsensing", IEEE Transactions on Wireless Communications, vol. 14, No. 11, Nov. 2015, pp. 6353-6364.

Xu et al., "Research on Secure Scalar Product Protocol and Its' Application", 6th International Conference on Wireless Communications Networking and Mobile Computing (WiCOM), Sep. 23-25, 2010, 4 pages.

* cited by examiner

600

602

Receiving encrypted sensory data from a top participating node of a participant chain, which comprises a plurality of participating nodes, wherein the encrypted sensory data comprise a plurality of encrypted sensory data obtained respectively by said plurality of participating nodes

604

Decrypting the encrypted data

Selecting the top participating node and at least one child participating node for the participant chain based on inferable privacy level, data utility and/or expected incentive

Fig.7

APPARATUS, METHOD AND COMPUTER PROGRAM PRODUCT FOR PRIVACY PROTECTION

RELATED APPLICATION

This application was originally filed as PCT Application No. PCT/CN2015/093646 filed Nov. 3, 2015.

FIELD OF THE INVENTION

Embodiments of the disclosure generally relate to data processing, and more particularly, to privacy protection technologies in a data collection task.

BACKGROUND

The fast development of networks and electronic devices has dramatically changed the way of data collection. Nowadays, most data collection tasks may relay on networks and electronic devices and in some cases require participation of users. For example, participatory sensing is a new paradigm of sensing data collection that may utilize ubiquitous sensor-embedded smart devices to collect various kinds of data, such as surrounding environment data around the users, transmit them to a platform center through a public communication network, such as a cellular network or internet, and get an incentive for the collected data. Considering the widely distributed smart phones, and their mobility and pervasive characteristics, the resulting data collected by the participatory sensing turn out to be more representative and accurate than those gathered by traditional fixed monitor stations.

However, the threat of privacy disclosure extends far beyond the temptation of incentives for participants. For example, in the process of traditional centralized participant selection, the private trajectories of all potential participants for some time in the future are completely exposed to an application/task server. These private trajectories can be used as a prior condition to weigh the quality requirement of sensing task against the budget constraint of incentives. In terms of data uploading and incentives distribution, additionally, the application server may know the source of each sensory data and the destination of each incentive. It is easy to obtain the private trajectories or even other privacy of participants due to the accurate temporal-spatial information within the uploaded sensory data. Moreover, even if the source of each sensory data is unknowable, one who contributes a major proportion of the whole uploaded sensory data is also likely to expose himself from the masses of participants. The application server itself or other attackers may maliciously abuse these privacy. Moreover, the disclosing of privacy may make many participants lose their enthusiasm of joining in. Thus, an improved privacy protection technology is desirable.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for privacy protection in a data collection task. Said method may comprise: receiving encrypted data from a top participating node of a participant chain, which comprises a plurality of participating nodes; and decrypting the encrypted data, wherein the encrypted data comprise a plurality of encrypted sensory data obtained respectively by said plurality of participating nodes.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to still another aspect of the present disclosure, it is provided a non-transitory computer readable medium having encoded thereon statements and instructions to cause a processor to execute the above-described method.

According to still another aspect of the present disclosure, it is provided an apparatus for privacy protection in a data collection task. Said apparatus comprises: a receiving element configured to receive encrypted data from a top participating node of a participant chain, which comprises a plurality of participating nodes; and a decrypting element configured to decrypt the encrypted data, wherein the encrypted data comprise a plurality of encrypted sensory data obtained respectively by said plurality of participating nodes.

According to one aspect of the disclosure, it is provided a method for privacy protection in a data collection task, comprising: receiving encrypted data from a child participating node of a participant chain, which comprises a plurality of participating nodes; combining the encrypted data with corresponding local encrypted data; and sending the combined encrypted data to a parent participating node of the participant chain, wherein the encrypted data comprise one or more encrypted sensory data.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to still another aspect of the present disclosure, it is provided a non-transitory computer readable medium having encoded thereon statements and instructions to cause a processor to execute the above-described method.

According to still another aspect of the present disclosure, it is provided an apparatus for privacy protection in a data collection task. Said apparatus comprises: a receiving element configured to receive encrypted data from a child participating node of a participant chain, which comprises a plurality of participating nodes; a combining element configured to combine the encrypted data with corresponding local encrypted data; and a sending element configured to send the combined encrypted data to a parent participating node of the participant chain, wherein the encrypted data comprise one or more encrypted sensory data.

According to one aspect of the disclosure, it is provided a method for privacy protection in a data collection task. Said method may comprise: dividing a second vector into third part and fourth part with an invertible matrix, wherein the second vector is related to sensory data that can be obtained by a candidate node; sending the third part to a representative participating node; receiving a second part of a first vector from the representative participating node, wherein the first vector is related to sensory data that can be obtained by the representative participating node; calculating second intermediate value of data utility based on the second part and the fourth part; and sending the second intermediate value to a task initiating node.

According to another aspect of the present disclosure, it is provided an apparatus comprising means configured to carry out the above-described method.

According to another aspect of the present disclosure, it is provided a computer program product embodied on a distribution medium readable by a computer and comprising program instructions which, when loaded into a computer, execute the above-described method.

According to still another aspect of the present disclosure, it is provided a non-transitory computer readable medium having encoded thereon statements and instructions to cause a processor to execute the above-described method.

According to still another aspect of the present disclosure, it is provided an apparatus for privacy protection in a data collection task. Said apparatus comprises: a dividing element configured to divide a second vector into third part and fourth part with an invertible matrix, wherein the second vector is related to sensory data that can be obtained by the apparatus; a sending element configured to send the third part to a representative participating node; a receiving element configured to receive a second part of a first vector from the representative participating node, wherein the first vector is related to sensory data that can be obtained by a representative participating node; a calculating element configured to calculate second intermediate value of data utility based on the second part and the fourth part; and the sending element further configured to send the second intermediate value to a task initiating node.

These and other objects, features and advantages of the disclosure will become apparent from the following detailed description of illustrative embodiments thereof, which is to be read in connection with the accompanying drawings.

BRIEF DESCRIPTION OF THE DRAWINGS

FIG. 6 is a flow chart depicting a process for privacy protection in a data collection task according to an embodiment of the present disclosure;

FIG. 7 is a flow chart depicting a process for privacy protection in a data collection task according to another embodiment of the present disclosure;

DETAILED DESCRIPTION

Figure 1:
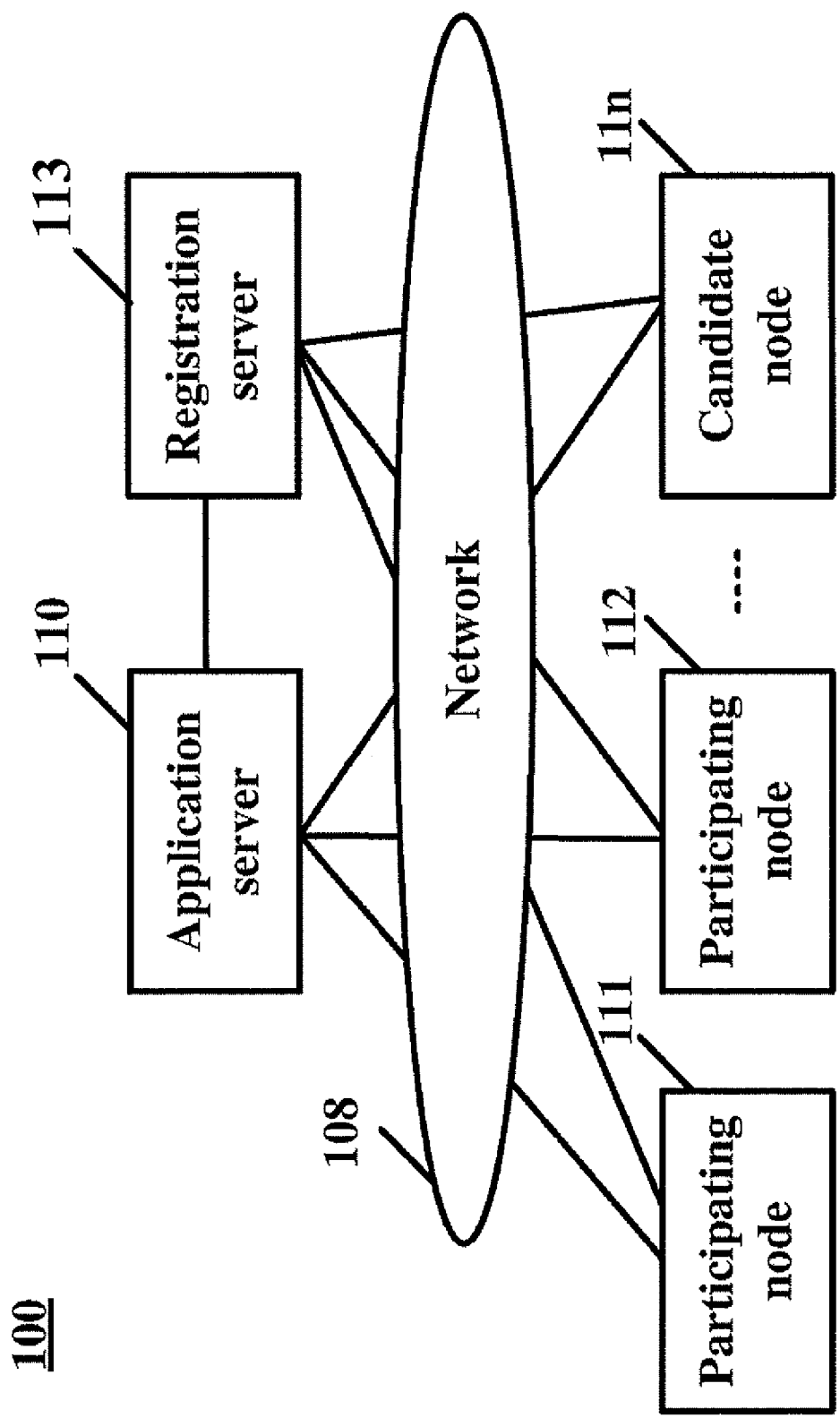
FIG. 1 shows a schematic system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

While the following embodiments are primarily discussed in the context of a participatory sensing task, it may be recognized by those of ordinary skill that the disclosure is not so limited. In fact, the various aspects of this disclosure are useful in any data collection task that can benefit from the privacy protection as is described herein.

In general, there are three steps in a typical participatory sensing task: participant selection, data uploading and incentives distribution. As the preparation, a participatory sensing task may be partitioned into multiple concurrent subtasks for example according to its geographic distribution. Note that the partition operation may not be required for example if there is only one geographic area. Numerous mobile and/or stationary users, who are willing to complete a series of subtasks passingly just around their whereabouts, may respond to the task requirement. First, application server may select an appropriate user group as participants to better satisfy the quality requirement of sensing task under the budget constraint of incentives. Then the selected participants perform their respective subtasks and upload the gathered sensory data by themselves to for example an application server. Each sensory data is evaluated to work out the corresponding incentive, which is then distributed to its deserver. Note that in some embodiments, the participant selection and/or incentives distribution can be omitted if the participatory sensing task has predetermined participants and/or need not to distribute incentives to the participants.

As used herein, the privacy can be classified as two kinds of privacy, visible privacy and inferable privacy. If the association between each sensory data/incentive and its provider/deserver is exposed, it can be referenced as the visible privacy. The visible privacy is of great help for obtaining the private trajectories or other privacy of participants. From another perspective, the imbalance of data proportion of the whole uploaded sensory data is also likely to expose some contributors who contributed the most from others. It can be used to infer a participant's privacy from the whole uploaded sensory data with a certain probability. This kind of privacy may be named as the inferable privacy.

As mentioned above, the participatory sensing has been widely used to collect data relying on an enormous contribution of users. Besides the tradeoff between the quality requirement of the participatory sensing task and the budget constraint of incentives for the participatory sensing task, privacy-preserving is also a thorny problem in the participatory sensing task. There is a conflict between the data requirements of application server and the urgent need of privacy-preserving for participants. The disclosing of participants' privacy may keep them away from joining in, especially for those who have strong self-protection awareness. Thus, it is desirable to provide an improved technical solution for privacy protection in the data collection task.

FIG. 1 depicts a schematic system, in which some embodiments of the present disclosure can be implemented. As shown in FIG. 1, the system 100 may comprise the application server (AS) or task initiating node 110 which may be configured to perform a data collection function, such as task partition, participating node/participant selection, incentive determination and distribution, data encryption and decryption, node management, or other suitable functions. In some embodiments where there are multiple data collection tasks going on, the AS 110 can also be used for those tasks. The AS 110 can be implemented in form of hardware, software or their combination, including but not limited to, cloud computer, distributed computing system, virtual computer, smart phones, tablets, laptops, servers, thin clients, set-top boxes and PCs. The AS 110 may run with any kind of operating system including, but not limited to, Windows, Linux, UNIX, Android, iOS and their variants. The AS 110 can maintain two pairs of public key and private key. One pair of public key and private key can be used for the data collected by the participating node. The other pair of public key and private key can be used for incentive distribution.

When a task $\mathcal{R}$ with space and/or time and/or any other suitable distribution is published by the AS 110, a mass of data gathered in multiple space regions and/or multiple time periods $\mathcal{L}$ may be required during a time $\tau$. Thus AS 110 may partition $\mathcal{R}$ into multiple subtasks according to altogether $\mathcal{L}$ space regions and/or time periods that it covers. In order to avoid the counterfeit data from malicious participants and improve data accuracy, multiple copies of data in each space region and/or time period are required from different participants. The task $\mathcal{R}$ may be illustrated in the following equation:

$$\mathcal{R} = \{r_{l,n} | l \in \mathcal{L}, n=1,2,\ldots,N\} \quad (1)$$

where, $r_{l,n}$ denotes data collected by a participating node n in a space region or time period l, and N denotes that each subtask requires N data $r_{l,n}$ in a space region or time period l to avoid too much redundant data. Thus $|\mathcal{L}| \cdot N$ data is required in total. In another embodiment, N may have same or different value for respective l and in this case the above and following equations used N may have different forms. The data in different space region or time period may have different importance for the whole sensing task. In order to encourage participants' enthusiasm of joining in and bidding for subtasks, the AS 110 may also provide a different range of promised incentives $\mathcal{B}$ for each l. It may be illustrated in the following equation:

$$\mathcal{B} = \{(\min_l, \max_l) | l \in \mathcal{L}\} \quad (2)$$

The system 100 may also comprise multiple participating nodes 111-112 each operably connected to an application server (AS) 110 through one or more networks 108. A participating node can represent a participant. The participating nodes 111-112 can be implemented in form of hardware, software or their combination, including but not limited to, fixed terminal, mobile terminal, portable terminal, smart phone, desktop computer, cloud client, laptop computer, intelligent glasses, vehicle-embedded terminals with various sensors, smart watch, hand set, station, unit, device, multimedia tablet, Internet/network node, communicator, Personal Digital Assistant (PDA), wearable device, client software, or any combination thereof. The participating nodes 111-112 may be used by a user to participate in a data collection task provided by the AS 110 if their users have been selected by the AS 110. For example, the users of the participating nodes 111-112 can join in the data collection task by using any suitable applications installed in the participating nodes 111-112. In general, the participating nodes 111-112 can be equipped with one or more I/O devices, such as microphone, camera, handwriting board, touch screen, display etc., to input and/or output information and/or data related to the data collection task, and/or one or more data gathering equipments, such as, microphone, camera, any kinds of sensors, for example environmental sensors (temperature sensors, humidity sensors, air pressure sensors, etc.) and health sensors, to collect various kinds of data around and/or concerning the users. Moreover, the data can be entered by the user or using any other suitable method. Note that a participating node can join in one or more data collection tasks simultaneously.

In an embodiment where the data collection task is divided into multiple subtasks, if the trajectory of any of nodes exactly covers certain subtasks, its user is likely to bid for these subtasks which can be completed passingly just around the user's whereabouts. All of these active nodes are candidate nodes $\mathcal{M} = \{m\}$ for the AS 110, and a series of subtasks $D_m$ is promised by each m under the corresponding expectation of incentives $B_m$. They may be illustrated in the following equation:

$$D_m = \{d_m^l | l \in \mathcal{L}, m \in \mathcal{M}\} \quad (3)$$

$$B_m = \{b_m^l | b_m^l \in (\min_l, \max_l), l \in \mathcal{L}, m \in \mathcal{M}\} \quad (4)$$

where, $d_m^l = \begin{cases} 1, \text{ if } m \text{ can gather one data in } l \\ 0, \text{ otherwise} \end{cases}$, $b_m^l$ denotes the incentive requirement for m in l.

$|d_m|$ sensory data altogether can be gathered by m under $|b_m|$ incentives in total within $|\mathcal{L}|$ location areas. $|d_m|$ and $|b_m|$ may be illustrated in the following equation:

$$|d_m| = \sum_{l \in \mathcal{L}} d_m^l \quad (5)$$

$$|b_m| = \sum_{l \in \mathcal{L}} b_m^l \quad (6)$$

It is worth noting that the details of $D_m$ or $B_m$ can indicate the private trajectory of m during $\tau$. All the gathered data $R_m$ by m may be denoted as below after its user performs his subtasks:

$$R_m = \{r_m^l | l \in \mathcal{L}, m \in \mathcal{M}\} \quad (7)$$

The system 100 may also comprise multiple candidate nodes 11n. A node can represent a user. The candidate nodes 11n are similar to the participating nodes 111-112 except that they do not join in the data collection task, i.e., they are not selected by the AS 110. For brevity, the description of the candidate nodes 11n is omitted herein.

The network 108 may comprise any kind of network or multiple networks operably connected. The terms "network" and "system" are often used interchangeably. Examples of the network 108 may include any wired or wireless network or their combination, including, but not limited to, a wireless cellular telephone network (such as the global system for mobile communications (GSM) network, 3rd generation (3G) network, 3.5th generation (3.5G) network, 4th generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, an Ethernet local area network, a token ring local area network, a wide area network, and the Internet.

Optionally, the system 100 may also comprise a registration server (RS) 113 which is configured to perform node management. For example, in case of mobile internet, a node such as mobile terminal can be accessed through its IP address which may be constantly changing with its unforeseen movement. Thus the RS 113 may be deployed to maintain the association between each mobile terminal's identification information and its real time network address such as IP address. It may also relieve the frequent communication load and prevent the identification information of nodes from being counterfeited. The latest network address of a node may be returned in response to the query of the AS 110 with the identification information and vice versa. The deployment of RS 113 may be benefit for embodiments where there are multiple ASes 110 in the system 100. Node that the function of RS 113 can also be integrated in the AS 110 or may be distributed among nodes in the system 100.

Figure 2:
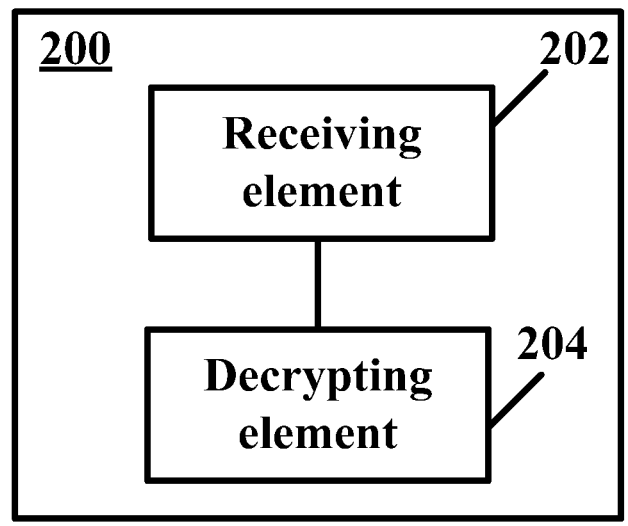
FIG. 2 is a simplified block diagram illustrating an apparatus according to an embodiment of the present disclosure.

FIG. 2 shows a simplified block diagram of an apparatus 200 capable of providing privacy protection according to an embodiment of the present disclosure. The apparatus 200 can be implemented in the AS 110 shown in the FIG. 1.

As shown in FIG. 2, the apparatus 200 may include a receiving element 202 for receiving encrypted data from a top participating node of a participant chain, which comprises a plurality of participating nodes. The data can be of any suitable data types, such as sensory data, identification information of a participating node or other data type. The data may be encrypted with first public key of the apparatus 200 by respective participating nodes. In this embodiment, the encrypted data comprise a plurality of encrypted sensory data obtained respectively by said plurality of participating nodes. Each encrypted sensory data is not associated with the identification information of each participating node. Since the top participating node can send the plurality of encrypted sensory data to the apparatus 200, and each encrypted sensory data does not contain the identification information, thus the apparatus 200 cannot identify the source of each sensory data. In this way, it can protect the participant's visible privacy.

In this embodiment, the participant chain can be constructed by the apparatus 200 based on any criteria, such as lowest delay, lowest cost and so on. Moreover the participant chain can include multiple participant chains. Each of which can include at least two participating nodes. The participating nodes can be predefined or selected by the apparatus 200 or elected by themselves.

In the process of data uploading, the apparatus 200 may assign a parent participating node and a child participating node for a participating node according to the participant chain, then the participating node can receive data packet containing encrypted data from its child participating node and get the payload of the data packet, combine the encrypted data with its corresponding encrypted data and send the combined encrypted data to its parent participating node. And the parent participating node may perform the same operations. Finally, the top participating node may get the combined encrypted data from its child participating node and combine the encrypted data with its corresponding encrypted data and send the combined encrypted data to its parent participating node, i.e., the apparatus 200. Thus the receiving element 202 may receive encrypted data from the top participating node.

After the receiving element 202 has received the encrypted data, a decrypting element 204 can decrypt the encrypted data such as with first private key corresponding to the first public key and obtain the decrypted data.

Figure 3:
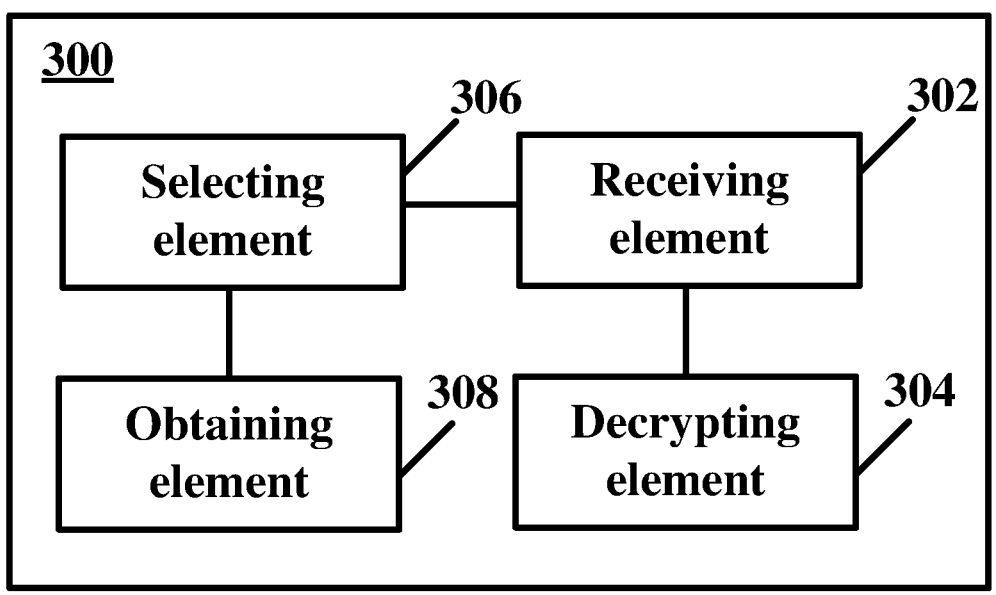
FIG. 3 is a simplified block diagram illustrating an apparatus according to another embodiment of the present disclosure.

FIG. 3 shows a simplified block diagram of an apparatus 300 capable of providing privacy protection according to an embodiment of the present disclosure. The apparatus 300 can be implemented in the AS 110 shown in the FIG. 1. The apparatus 300 may comprise a receiving element 302 and a decrypting element 304 which can perform the similar functions as those shown in FIG. 2. For brevity, the description of these similar functions is omitted herein.

The apparatus 300 can further comprise a selecting element 306 which can select the top participating node and at least one child participating node for the participant chain based on inferable privacy level, data utility and/or expected incentive. In this embodiment, the at least one child participating node for the participant chain is defined as all the participating nodes except that the top participating node.

The inferable privacy level may be used to quantitatively measure the degree of disclosing in the inferable privacy. In an embodiment, the inferable privacy level p(X) can be based on entropy theory. It may be illustrated in the following equation:

$$p(X) = -\sum_{m \in X} \left( \frac{|d_m|}{\sum_{n \in X} |d_n|} \cdot \log_2 \frac{|d_m|}{\sum_{n \in X} |d_n|} \right) \quad (8)$$

where, X denotes the selected participating nodes $x \subseteq \mathcal{M}$, $|d_m|$ have been defined in equation 5. The privacy preservation is better satisfied with a larger p(X) due to the unpredictability. In another embodiment, p(X) can be defined using any other suitable method.

The data utility u(X) may be utilized to formulate the quality requirement. The quality requirement of a data collection task may comprise the accuracy and/or coverage of data. To increase the data accuracy, it is required that multiple data from different participants should be uploaded in each l to against the counterfeit data from malicious participants. For the data coverage, uniformly distributed data among subtasks may be required. The total amount of data $d_l(X)$ gathered by X for each l may be denoted as below:

$$d_l(X) = \Sigma_{m \in X} d_m^l \quad (9)$$

where, $d_m^l$ has been defined in equation 3. The data utility u(X) may be illustrated in the following equation:

$$u(X) = -\frac{\sum_{l \in \mathcal{L}} (N - d_l(X))^2}{|\mathcal{L}| \cdot N^2} \quad (10)$$

When the same amount of data is gathered, u(X) gives high values to uniformly distributed data. u(X) is expected to as large as possible to achieve a quasi-optimal quality requirement. For example, to get a large u(X), each $d_l(X)$ is better to close to N. In another embodiment, u(X) can be defined using any other method.

The expected incentive is the total incentive of all the participating nodes and is required not exceeding a predetermined budget constraint of incentives $\mathcal{B}$. An incentive for each sensory data may be promised to a participant in order to encourage the participant's enthusiasm of joining in. The budget for a data collection task is usually finite. Considering the cost saving of the task, the different range of promised incentive within each subtask may be given to participants. It can lead to the competition of bidding among them. The whole expected incentives b(X) of X may be suggested to not exceeding $|\mathcal{B}|$. b(X) may be illustrated in the following equation:

$$b(X) = \Sigma_{m \in X} |b_m| \leq |\mathcal{B}| \quad (11)$$

In an embodiment, the selecting element 306 can perform the selection based on the inferable privacy level such that each participating node may perform the substantially same number of subtasks. In another embodiment, the selecting element 306 can perform the selection based on the expected incentive such that the expected incentive is as low as possible. In still another embodiment, the selecting element 306 can perform the selection based on the data utility such that the data utility is as large as possible.

In still another embodiment, the selecting element 306 can perform the selection based on the inferable privacy level, the data utility and the expected incentive. In this embodiment, the receiving element 302 can receive the number of subtasks that can be performed by a candidate node and the total incentive requirement for the candidate node. For example, the apparatus 300 can send the task description information, such as geographical region of each subtask, time requirement of each subtask, user type requirement of each subtask, incentive range of each subtask or other suitable information, to each candidate node in the system, then a candidate node m can send the number of subtasks $|d_m|$ that it can perform and its total incentive requirement $|b_m|$ for these subtasks to the apparatus 300. Then the receiving element 302 can receive $|d_m|$ and $|b_m|$ from the candidate node m.

After getting the number of subtasks and the total incentive requirement of each candidate node m, the apparatus 300 can calculate the inferable privacy level based on the number of subtasks such as using equation 8; and calculate the expected incentive based on the total incentive requirement such as using equation 11.

Since the apparatus 300 can only get the values of $|d_m|$ and $|b_m|$, it cannot infer the privacy of a participant m, such as the trajectory of m, the details of incentives of m, etc. The calculation of p(X) and b(X) only require the values of $|d_m|$ and $|b_m|$ according to equations 8 and 11, which can be done by the apparatus 300. The calculation of u(X) needs the details of $D_m$, however, the apparatus 300 cannot obtain the details of $D_m$ in order to protect privacy.

In an embodiment, the receiving element 302 may receive information about the data utility. In an embodiment, the information can comprise the value of the data utility calculated by one or more nodes. In another embodiment, the information can comprise the details of $d_i(x)$ which can be used to compute the value of the data utility by the computing element. In another embodiment, the information may comprise two intermediate values of the data utility. The two intermediate values can be any suitable intermediate values of the data utility such that the apparatus 300 can use the two intermediate values to obtain the value of the data utility. For example, the two intermediate values can be computed with a security multiparty scalar product protocol as described following.

In an embodiment, an obtaining element 308 may obtain data utility for a candidate node through collaboration between a representative participating node and the candidate node. The representative participating node may represent all the participating nodes selected by the apparatus 300 currently. The collaboration will be described in the following security multiparty scalar product protocol.

In this embodiment, the receiving element 302 can receive two intermediate values of data utility from the representative participating node and the candidate node. Then, a recovering element (not shown in FIG. 3) can recover the data utility for the candidate note based on the two intermediate values. The recovery will be described in the following security multiparty scalar product protocol.

After the apparatus 300 has got the inferable privacy level, data utility and expected incentive, the selecting element 306 can select the participating nodes. In an embodiment, the selecting element 306 can perform the selection by using borda-count-based selection algorithm. In the borda-count-based selection algorithm, Borda Count can rank the candidate nodes in order of the preference with different criterions, and select the winner who is broadly acceptable rather than preferred by a majority. One example borda-count-based selection algorithm is as following:

---

Algorthm 1: Borda-count-based Selection Algorithm

---

Input : $|d_m|$, $|b_m|$ and $u(\chi + m)$ of $m \in \mathcal{M}$
Output : $\chi$
n ← Latest amount of $\mathcal{M}$
dm[m] ← array of m ranked by descending order of $|d_m|$
bm[m] ← array of m ranked by ascending order of $|b_m|$
u[m] ← array of m ranked by descending order of $u(\chi + m)$
p[m] ← array of m ranked by descending order of $p(\chi + m)$
b[m] ← array of m ranked by ascending order of $b(\chi + m)$
1: Initial array rank[m] and score[m]
2: foreach i = 0 to (n − 1)
3:   In the first round of iteration:
4:   foreach j = 0 to (n − 1)
5:     if dm[j] == i then score[i]+ = (n − j) end
6:   end
7:   foreach k = 0 to (n − 1)
8:     if bm[k] == i then score[i]+ = (n − k) end
9:   end
10:  In the next rounds of iteration:
11:  foreach j = 0 to (n − 1)
12:    if u[j] == i then score[i]+ = (n − j) end
13:  end
14:  foreach k = 0 to n − 1)
15:    if b[k] == i then score[i]+ = (n − k) end
16:  end
17:  foreach l = 0 to (n − 1)
18:    if p[l] == i then score[i]+ = (n − l) end
19:  end
20: end
21: rank[m] ← array of m ranked by descending order of score[i]
22: foreach j = 0 to (n − 1)
23:   if b($\chi$ + rank[j]) ≤ $|\mathcal{B}|$ then
24:     Move rank[j]) from $\mathcal{M}$ to X, and break
25:   end
26: end
27: return $\chi$

--- where, X denotes the set of selected participating nodes, m denotes a candidate node, X+m denotes the union of X and m, and M denotes the set of candidate nodes. This algorithm can balance the requirements of larger u(X+m), higher p (X+m), and lower b(X+m). In this algorithm, the selecting element 306 ranks u(X+m) and p(X+m) in descending order, and b(X+m) in ascending order. The winner is selected based on the comprehensive rankings and validated according to the limitation of $|\mathcal{B}|$. In the first round of iteration with no participant in X, specifically, the selecting element 306 only ranks $|d_m|$ in descending order and $|b_m|$ in ascending order to select the first winner. The iteration continued until no m can be selected into X to satisfy b(X+m)≤$|\mathcal{B}|$.

In the following we describe the communication process of this algorithm. In the first round of iteration, the apparatus 300 may publicize the information about the required $\mathcal{R}$ and promised $\mathcal{B}$ to all of candidate nodes in the network. If the network address (such as IP address) of a candidate node may change, then the apparatus 300 may get the latest network address of the candidate node from the RS 113. A user of m∈$\mathcal{M}$, who is willing to bid for a series of subtasks, decides his $D_m$ and the corresponding $B_m$ according to $\mathcal{R}$ and $\mathcal{B}$. The values of $|d_m|$ and $|b_m|$ are calculated by m itself and sent to the apparatus 300. Based on the received information, the first winner A is selected by the selecting element 306 with the Borda-count-based selection algorithm. The selecting element 306 also records the identification of A, which can be queried from the RS 113. As the first one of X, A is regarded as x, which is the representative of X. In the second round of iteration, AS can inform the rest $m \in \mathcal{M}$ of the latest network address of X. Then the following security multiparty scalar product protocol may be performed between x and each m:

---

Protocol 1: Security Multiparty Scalar Product Protocol

---

Input: AS has a random invertible matrix $M_{(|\mathcal{L}| \times |\mathcal{L}|)}$ x has vector $D_x$ m has vector $D_m$, $m \in \mathcal{M}$ Output: AS has the statistic value of $u(x + m)$ 1: AS: (Send) $M_{(|\mathcal{L}| \times |\mathcal{L}|)} \Rightarrow x$ $M_{(|\mathcal{L}| \times |\mathcal{L}|)} \Rightarrow m$ 2: x: (Calculate) $D_{x1} = D_x \cdot M_{left(|\mathcal{L}| \times \frac{|\mathcal{L}|}{2})}$ $D_{x2} = D_x \cdot M_{right(|\mathcal{L}| \times \frac{|\mathcal{L}|}{2})}$ (Send) $D_{x2} \Rightarrow m$ 3: m: (Calculate) $D_{m1} = M^{-1}_{top(\frac{|\mathcal{L}|}{2} \times |\mathcal{L}|)} \cdot D_m^T$ $D_{m2} = M^{-1}_{bottom(\frac{|\mathcal{L}|}{2} \times |\mathcal{L}|)} \cdot D_m^T$ (Send) $D_{m1} \Rightarrow x$ 4: x: (Calculate) $D_{xm} = D_{x1} \cdot D_{m1}$ $D'_{xm} = 2D_{xm} - 2N \cdot |d_x| + \sum_{l \in \mathcal{L}} (d_x^l)^2$ (Send) $D_{xm}' \Rightarrow AS$ 5: m: (Calculate) $D_{mx} = D_{x2} \cdot D_{m2}$ $D'_{mx} = 2D_{mx} - 2N \cdot |d_m| + \sum_{l \in \mathcal{L}} (d_m^l)^2$ (Send) $D_{mx}' \Rightarrow AS$ 6: AS: (Calculate) $u(x + m) = 1 - \dfrac{D'_{xm} + D'_{mx}}{|\mathcal{L}| \cdot N^2}$

---

The security multiparty scalar product protocol is utilized to cooperatively calculate u(x+m) without exposing the details of $D_x$ nor $D_m$ to each other. In the protocol, firstly the apparatus 300 (such as AS 110) may sends an (random) invertible matrix $M_{(|\mathcal{L}| \times |\mathcal{L}|)}$ to x and each m, or the invertible matrix may be predefined and known to every node in the network. $D_x$ and $D_m$ are divided into two parts with $M_{(|\mathcal{L}| \times |\mathcal{L}|)}$ respectively, and the specific parts of $D_x$ and $D_m$ are exchanged between x and m. Then two intermediate values of u(x+m), $D'_{xm}$ and $D'_{mx}$, are calculated respectively and sent to the AS for recovering the values of u(x+m). Similar to the first round of iteration, the selecting element 306 selects the second winner B and records B's identification. Additionally, the AS may inform x of B's latest IP address, who is regarded as the parent participating node of B and should send his $D_x$ to B for integrating $D_x$ and $D_B$ to generate $D_{x+B}$. With the $D_{x+B}$, B is involved in the next round of iteration as the new x and so on. All the selected participating nodes may constitute a sequential participant chain after the iterative process.

After the apparatus 300 has selected the participating nodes, the apparatus 300 may organize the participating nodes into at least one participant chain. The apparatus 300 can also designate the top participating node, and a parent participating node and a child participating node for every participating node, and send related information to corresponding participating node.

In an embodiment where each sensory data is associated with an encryption key and a unique random identification, a determining element (not shown in FIG. 3) may determine a deserved incentive for each sensory data. The determining element can use any suitable existing or future method to determine the deserved incentive.

In an embodiment where each sensory data is associated with a desired incentive, the determining element can determine the deserved incentive for each sensory data based on the desired incentive. For example, the deserved incentive may not be larger than the desired incentive. Alternatively, the determining element can obtain the total desired incentive for a subtask, and reallocated the total desired incentive among all the sensory data for this subtask, for example based on the quality of the sensory data.

After the deserved incentive has been determined, an encrypting element (not shown in FIG. 3) can encrypt the deserved incentive with second private key of the apparatus 300 and the encryption key. For example, supposing that a deserved incentive for sensory data $r_m^l$ is $\hat{b}_m^l$, which may be decided according to the quality of sensory data $r_m^l$ and the expected $b_m^l$, and the sensory data $r_m^l$ contains the unique random identification $R_m^n$ and the encryption key $\mathcal{K}_m^n$, then $K'_{spriv}$ provided by the apparatus 300 and $K_m^n$ may be used for encrypting $\hat{b}_m^l$ as following:

$$\{\{\hat{b}_m^l\}_{\mathcal{K'}_{spriv}}\}_{\mathcal{K}_m^n} \qquad (12)$$

$K'_{spriv}$ may ensure that each $m \in X$ receives his own encrypted incentives before all of them could decrypt their respective encrypted deserved incentives. In other word, if the AS has determined that all the participating nodes have received their respective encrypted deserved incentives, the AS may issue the second public key corresponding to $K'_{spriv}$ to all the participating nodes. Note that, in (12), the locations of $K'_{spriv}$ and $K_m^n$ can exchange.

$R_m^n$ and $K_m^n$ may be random generated for each sensory data by each participating node and added into each sensory data. $R_m^n$ is not related to the identification information of a participating node. In other word, the AS cannot use $R_m^n$ to identify the source of each encrypted sensory data. For each decrypted sensory data, the apparatus 300 may generate the incentive information including the encrypted deserved incentive and its associated unique random identification as following:

$$R_m^n | \{\{\hat{b}_m^l\}_{\mathcal{K'}_{spriv}}\}_{\mathcal{K}_m^n} \qquad (13)$$

Note that $R_m^n$ may also be appended after the encrypted deserved incentive. The $R_m^n$ can help its deserver recognize its corresponding deserved incentive.

Then, a sending element (not shown in FIG. 3) can send the incentive information including the encrypted deserved incentive and its associated unique random identification to the top participating node. In an embodiment, the incentive information can contain the incentive information for all the sensory data.

In an embodiment, the sending element can send second public key corresponding to the second private key to all the participating nodes when all the participating nodes have received their respective encrypted deserved incentives. As an example, the receiving element 302 can receive information that all the participating nodes have received their respective encrypted deserved incentives. For example, the last participating node of the participant chain may send a message indicating reception of its encrypted deserved incentive. Then the apparatus 300 may know that all the participating nodes have received their respective encrypted deserved incentives. In another embodiment, each participating node can send information indicating whether it has received its encrypted deserved incentive, then the apparatus 300 can determine whether all the participating nodes have received their respective encrypted deserved incentives. If all the participating nodes have received their respective encrypted deserved incentives, the sending element can send second public key corresponding to the second private key to all the participating nodes. For example, the sending element may use broadcast or multicast technology to distribute the second public key.

In an embodiment, a detecting element (not shown in FIG. 3) can detect a malicious participating node based on an alert message from a participating node not receiving its encrypted deserved incentive. For example, if a participating node fails to receive its encrypted deserved incentive from its parent participating node, then it may send an alert message to the AS. The detecting element can detect that this participating node's parent participating node may be a malicious participating node based on the alert message.

In an embodiment where the encrypted data further comprise encrypted identification information of each participating node sent respectively by said plurality of participating nodes and the encrypted identification information is not associated with the encrypted sensory data, the detecting element can further detect a malicious participating node based on the identification information. For example, a participating node can send second encrypted data containing its identification information. The AS can get this encrypted data and decrypt it to obtain the identification information. If there are not malicious participants, the AS may get all identification information for all the participating nodes. For example, supposing that the sequence of the identification information is same as the participant chain, if the AS has found that the identification information of a participating node is missing or corrupted, then it can detect that this participating node's parent participating node may be a malicious participating node which may discard the received messages from its child participating node.

In an embodiment, an evaluating element (not shown in FIG. 3) can evaluate the quality of sensory data based on majority vote method. The majority vote method may detect those sensory data of low quality or counterfeited by a malicious participant. The evaluated quality of sensory data can be used by the determining element to determine the deserved incentive for each decrypted sensory data, and can also be used by the detecting element to detect the malicious participating node which counterfeits the sensory data.

According to various embodiments, the AS can reject the malicious participating node to join in any data collection tasks in a predefined time period or evermore.

Figure 4:
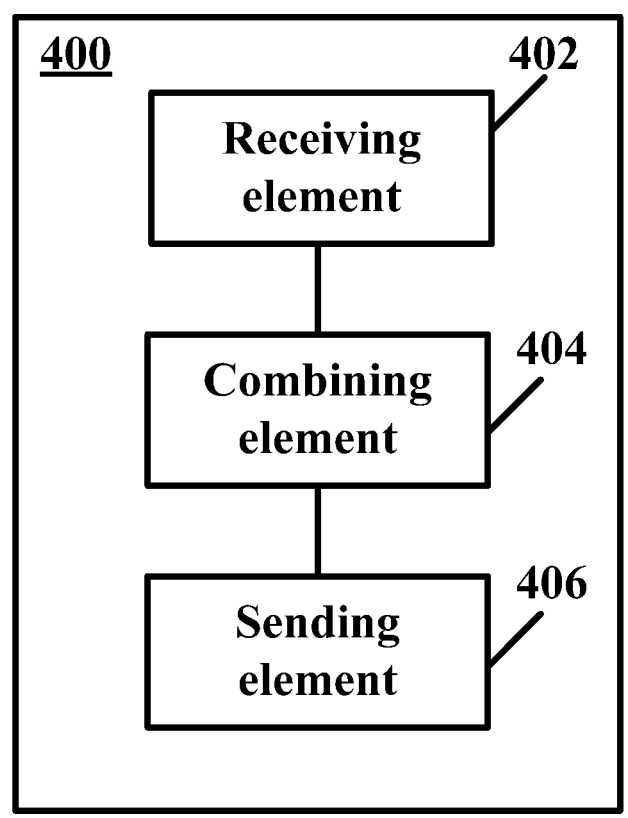
FIG. 4 is a simplified block diagram illustrating an apparatus according to still another embodiment of the present disclosure.

FIG. 4 shows a simplified block diagram of an apparatus 400 capable of providing privacy protection according to an embodiment of the present disclosure. The apparatus 400 can be implemented in the participating nodes 111-112 shown in the FIG. 1.

As shown in FIG. 4, the apparatus 400 may include a receiving element 402 for receiving encrypted data from a child participating node of a participant chain, which comprises a plurality of participating nodes. As described above, the data can be of any suitable data types, such as sensory data, identification information or other data type. The data may be encrypted with first public key of the AS 110 by respective participating nodes. In this embodiment, the encrypted data comprise one or more encrypted sensory data.

In this embodiment, the apparatus 400 may have known its child participating node and parent participating node. For example the AS 110 may use the same participating nodes to perform multiple tasks. In another embodiment, the receiving element 402 can receive information about the child participating node and the parent participating node from the AS 110. For example, the AS 110 may select the participating nodes and construct the participant chain, and send information about the child participating node and the parent participating node to each participating node. The information can include the network addresses (such as IP addresses) of the child participating node and the parent participating node and/or other suitable information.

Then a combining element 404 can combine the encrypted data with corresponding encrypted data of the apparatus 400. For example, the encrypted sensory data from the child participating node may be combined with the encrypted sensory data of the apparatus 400. Note that, the combination can be a random combination or any other suitable combination such that the AS 110 cannot infer the source of each sensory data. Then a sending element 406 may send the combined encrypted data to a parent participating node of the participant chain. When a top participating node has received the combined encrypted data from its child participating node, it will send this combined encrypted data to the AS 110.

In an embodiment, the above mentioned security multiparty scalar product protocol may be performed between the apparatus 400 and each candidate node. Note that in this embodiment, the apparatus 400 is a representative participating node. With reference to the above description of security multiparty scalar product, the process of security multiparty scalar product protocol in the apparatus 400 is as following: a dividing element (not shown in FIG. 4) may divide a first vector $D_x$ into first part $D_{x1}$ and second part $D_{x2}$ with an invertible matrix $M_{(|L| \times |L|)}$, wherein the first vector $D_x$ is related to subtasks (or sensory data) that can be performed (or obtained) by a representative participating node, as defined in equation 3. The representative participating node can represent the participating nodes selected by the AS 110 currently. Then the sending element 406 may send the second part $D_{x2}$ to a candidate node m; and the receiving element 402 may receive a third part $D_{ml}$ of a second vector $D_m$ from the candidate node m, wherein the second vector $D_m$ is related to sensory data that can be obtained by the candidate node m, as defined in equation 3. Subsequently, a calculating element (not shown in FIG. 4) can calculate first intermediate value $D'_{xm}$ of data utility based on the first part and the third part, and the sending element 406 can send the first intermediate value $D'_{xm}$ to a task initiating node such as AS 110.

In an embodiment, each sensory data may be associated with an encryption key and a unique random identification. The unique random identification is not related to the identification information of a participating node. For example, the apparatus 400 can generate a different unique random identification and a different encryption key for its each sensory data. The receiving element 402 can receive incentive information including an encrypted deserved incentive for each of at least one sensory data and its associated unique random identification from the apparatus 400's parent participating node, wherein each deserved incentive may be encrypted with second private key of a task initiating node (AS 110) and the encryption key containing in each encrypted sensory data as described above. For example, one exemplify encrypted sensory data of a participating node m is as following:

$$\{l|r_m^l|b_m^l|R_m^n \, \mathcal{K}_m^n\}_{\mathcal{K}_{spub}}$$

where, l denotes the identification of a subtask or space region or time period, $r_m^l$ denotes the data collected by m in l, $b_m^l$ denotes a desired incentive for $r_m^l$, $R_m^n$ denotes a unique random identification, $\mathcal{K}_m^n$ denotes the encryption key and $\mathcal{K}_{spub}$ denotes the first public key of the AS 110. When the AS 110 gets this encrypted data, it may determine a deserved incentive $\hat{b}_m^l$ for the $r_m^l$, and send the incentive information including an encrypted deserved incentive for each of at least one sensory data and its associated unique random identification to the top participating node as described above.

Then an extracting element (not shown in FIG. 4) can extract a encrypted deserved incentive from the incentive information with a unique random identification included in each encrypted sensory data of the apparatus 400, such as $R_m^n$. In an embodiment, when the extracting element fails to extract the encrypted deserved incentive, the sending element 406 can send an alert message to the task initiating node. The task initiating node can use the alert message to detect a malicious participating node as described above.

If the extracting element may extract the encrypted deserved incentive successfully, then the sending element 406 can send the rest of the incentive information to the child participating node.

In an embodiment, each encrypted sensory data further comprises a desired incentive. The desired incentive can be used by the AS to determine the deserved incentive for each encrypted sensory data as described above.

In an embodiment, the sending element 406 can send information that the apparatus 400 has received its encrypted deserved incentive. This information can help the AS check whether all the participating nodes have received their respective encrypted deserved incentives as described above.

In an embodiment, if the AS has determined that all the participating nodes have received their respective encrypted deserved incentives, it may send second public key corresponding to the second private key. Then the receiving element 402 may receive the second public key. A decrypting element (not shown in FIG. 4) can decrypt the encrypted deserved incentive for the apparatus 400's each encrypted sensory data with the second public key and the decryption key corresponding to the encryption key included in the apparatus 400's each encrypted sensory data.

In an embodiment, the encrypted data further comprises encrypted identification information of a participating node sent by the participating node and the encrypted identification information is not associated with the encrypted sensory data. The identification information can be used by the AS to detect a malicious participating node based on the identification information as described above.

Figure 5:
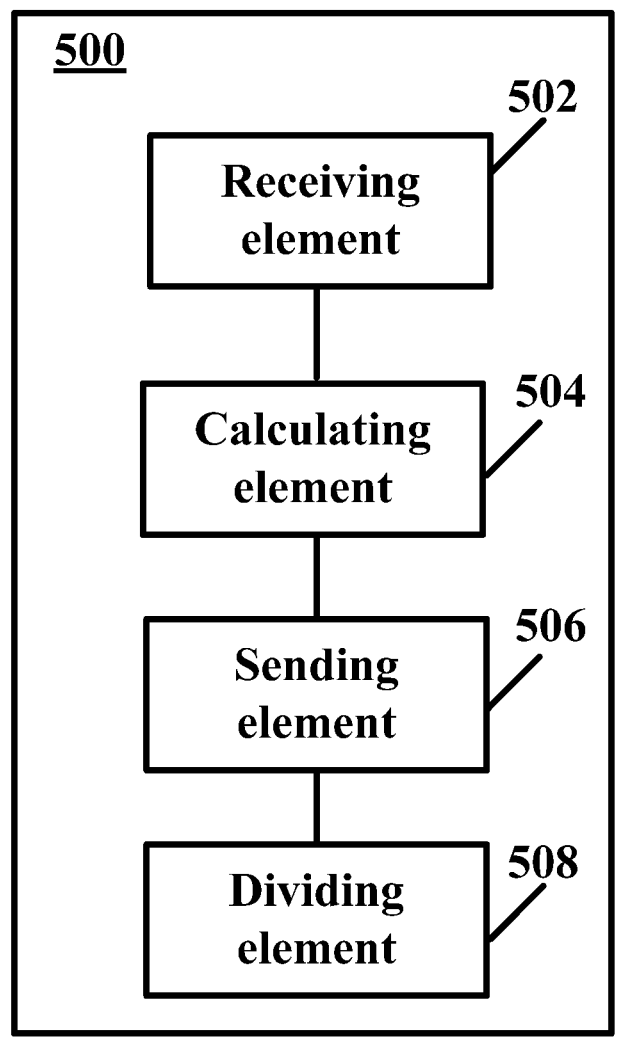
FIG. 5 is a simplified block diagram illustrating an apparatus according to still another embodiment of the present disclosure.

FIG. 5 shows a simplified block diagram of an apparatus 500 capable of providing privacy protection according to an embodiment of the present disclosure. The apparatus 500 can be implemented in the candidate node 11n shown in the FIG. 1.

The apparatus 500 can cooperate with a representative participating node such as the apparatus 400 to perform security multiparty scalar product protocol as described above and perform other functions. With reference to the above description of the security multiparty scalar product protocol, the apparatus 500 has received the invertible matrix $M_{(|\mathcal{L}|\times|\mathcal{L}|)}$, and has the second vector $D_m$ which is related to sensory data that can be obtained by the apparatus 500, as defined in equation 3. As shown in FIG. 5, a dividing element 508 may divide the second vector $D_m$ into third part $D_{m1}$ and fourth part $D_{m2}$ with the $M_{(|\mathcal{L}|\times|\mathcal{L}|)}$; and a sending element 506 can send the third part $D_{m1}$ to a representative participating node such as the apparatus 400; a receiving element 502 can receive the second part $D_{x2}$ of the first vector $D_x$ from the representative participating node, wherein the first vector $D_x$ is related to sensory data that can be obtained by a representative participating node, as defined in equation 3; then a calculating element 504 can calculate second intermediate value $D'_{mx}$ of data utility based on the second part $D_{x2}$ and the fourth part $D_{m2}$; and the sending element 506 can send the second intermediate value $D'_{mx}$ to a task initiating node such as the AS.

In an embodiment, the sending element 506 can send the number of subtasks that can be performed by the apparatus 500 and the total incentives requirement for the apparatus 500 to the task initiating node such as the AS.

Under the same inventive concept, FIGS. 6 to 9 are flow charts showing processes for privacy protection in a data collection task according to some embodiments of the present disclosure. The present disclosure will be described below with reference to these figures. For same parts or functions as described in the previous embodiments, the description thereof is omitted for brevity.

FIG. 6 shows a process for privacy protection in a data collection task according to an embodiment of the present disclosure. The process 600 can be performed by the apparatus 200 shown in FIG. 2. As shown in FIG. 6, the process 600 starts at step 602, where the apparatus 200 can receive encrypted data from a top participating node of a participant chain, which comprises a plurality of participating nodes. At step 604, the apparatus 200 can decrypt the encrypted data. In this embodiment, the encrypted data comprise a plurality of encrypted sensory data obtained respectively by said plurality of participating nodes.

FIG. 7 shows a process for privacy protection in a data collection task according to an embodiment of the present disclosure. The process 700 can be performed by the apparatus 300 shown in FIG. 3. As shown in FIG. 7, at step 702, the apparatus 300 may select the top participating node and at least one child participating node for the participant chain based on inferable privacy level, data utility and/or expected incentive as described above.

In an embodiment, the process 700 can also include an obtaining step for obtaining data utility for a candidate node through collaboration between a representative participating node and the candidate node.

In an embodiment the process 700 can also include steps for receiving two intermediate values of data utility from the representative participating node and the candidate node; and recovering the data utility for the candidate note based on the two intermediate values.

In an embodiment, at step 702, the apparatus 300 may perform the selection through the borda-count-based selection algorithm as described above.

In an embodiment, each sensory data is associated with an encryption key and a unique random identification, and the process 700 further comprises steps of: determining a deserved incentive for each sensory data; encrypting the deserved incentive with a local second private key and the encryption key; and sending the incentive information including the encrypted deserved incentive and its associated unique random identification to the top participating node.

In an embodiment, each sensory data is associated with a desired incentive, and the step of determining further comprises determining the deserved incentive for each sensory data based on the desired incentive.

In an embodiment, the process 700 further comprises a step of sending second public key corresponding to the local second private key to all the participating nodes when all the participating nodes have received their respective encrypted deserved incentives.

In an embodiment, the process 700 further comprises a step of detecting a malicious participating node based on an alert message from a participating node not receiving its encrypted deserved incentive.

In an embodiment, the encrypted data further comprise encrypted identification information of each participating node sent respectively by said plurality of participating nodes and the encrypted identification information is not associated with the encrypted sensory data, and the process 700 further comprises a step of detecting a malicious participating node based on the identification information.

In an embodiment, the process 700 further comprises a step of evaluating the quality of sensory data based on majority vote method.

Figure 8:
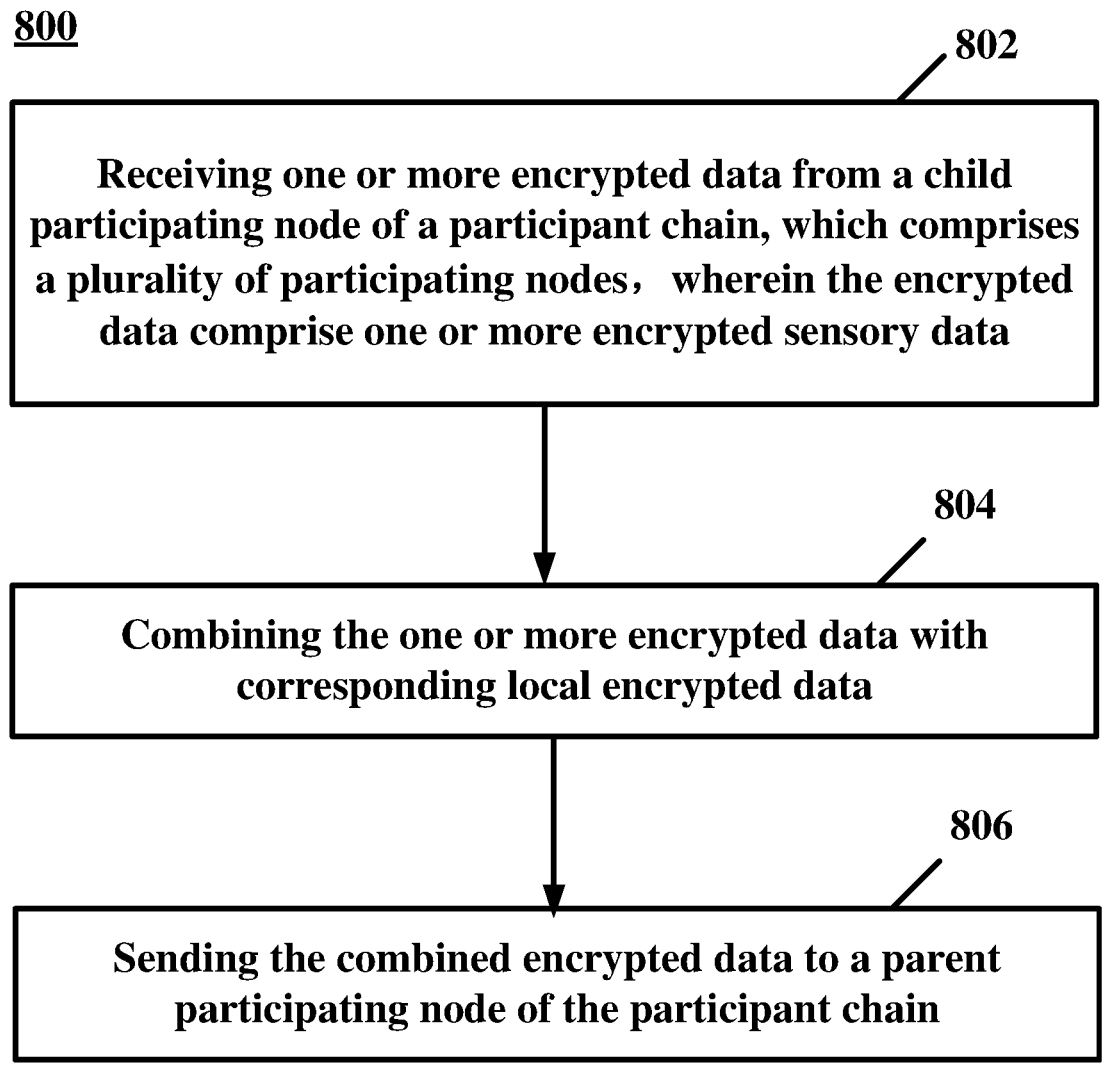
FIG. 8 is a flow chart depicting a process for for privacy protection in a data collection task according to still another embodiment of the present disclosure.

FIG. 8 shows a process for privacy protection in a data collection task according to an embodiment of the present disclosure. The process 800 can be performed by the apparatus 400 shown in FIG. 4. As shown in FIG. 8, the process 800 starts at step 802, where the apparatus 400 can receive encrypted data from a child participating node of a participant chain, which comprises a plurality of participating nodes. At step 804, the apparatus 400 can combine the encrypted data with corresponding local encrypted data. At step 806, the apparatus 400 can send the combined encrypted data to a parent participating node of the participant chain. In this embodiment, the encrypted data comprise one or more encrypted sensory data.

In an embodiment, the process 800 further comprises steps of dividing a first vector into first part and second part with an invertible matrix, wherein the first vector is related to sensory data that can be obtained by a representative participating node; sending the second part to a candidate node; receiving a third part of a second vector from the candidate node, wherein the second vector is related to sensory data that can be obtained by the candidate node; calculating first intermediate value of data utility based on the first part and the third part; and sending the first intermediate value to a task initiating node.

In an embodiment, each sensory data is associated with an encryption key and a unique random identification, and the process 800 further comprises steps of receiving incentive information including an encrypted deserved incentive for each of at least one sensory data and its associated unique random identification from the parent participating node, wherein each deserved incentive is encrypted with the task initiating node's second private key and the encryption key; extracting a local encrypted deserved incentive from the incentive information with a local unique random identification; and sending the rest of the incentive information to the child participating node.

In an embodiment, each sensory data is associated with a desired incentive.

In an embodiment, the process 800 further comprises steps of sending information about reception of encrypted deserved incentive to the task initiating node; receiving second public key corresponding to the second private key from the task initiating node; and decrypting the local encrypted deserved incentive with the second public key and the decryption key corresponding to its associated encryption key.

In an embodiment, the process 800 further comprises a step of sending an alert message to the task initiating node when fail to extract the local encrypted deserved incentive.

In an embodiment, the encrypted data further comprise encrypted identification information of a participating node sent by the participating node and the encrypted identification information is not associated with the encrypted sensory data.

Figure 9:
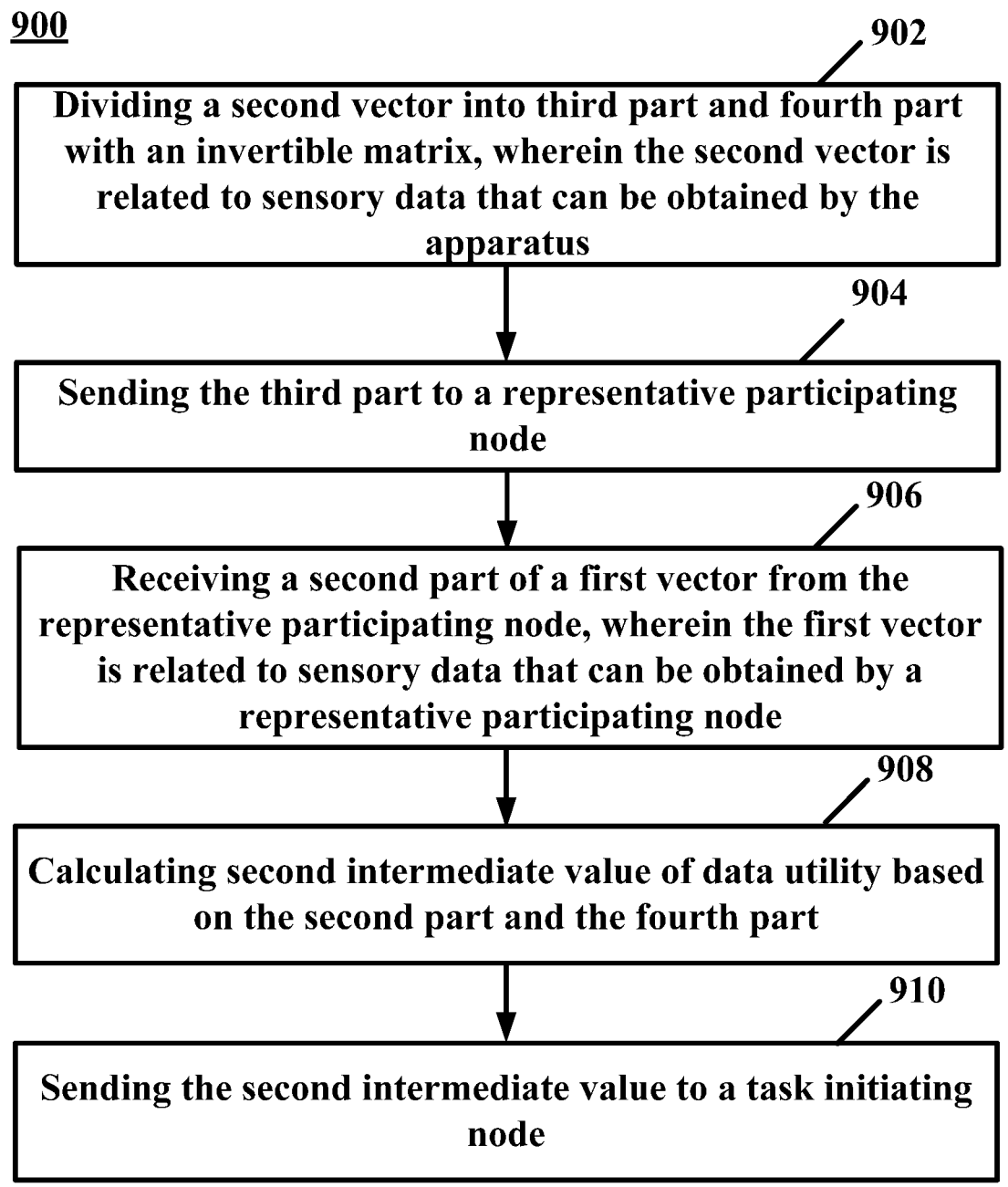
FIG. 9 is a flow chart depicting a process for privacy protection in a data collection task according to still another embodiment of the present disclosure.

FIG. 9 shows a process for privacy protection in a data collection task according to an embodiment of the present disclosure. The process 900 can be performed by the apparatus 500 shown in FIG. 5. As shown in FIG. 9, the process 900 starts at step 902, where the apparatus 500 can divide a second vector into third part and fourth part with an invertible matrix, wherein the second vector is related to sensory data that can be obtained by a candidate node. At step 904, the apparatus 500 can send the third part to a representative participating node. At step 906, the apparatus 500 can receive a second part of a first vector from the representative participating node, wherein the first vector is related to sensory data that can be obtained by a representative participating node. At step 908, the apparatus 500 can calculate second intermediate value of data utility based on the second part and the fourth part. At step 910, the apparatus 500 can send the second intermediate value to a task initiating node.

In an embodiment, the process 900 further comprises a step of sending the number of subtasks that can be performed by the candidate node and the total incentives requirement for the candidate node to the task initiating node.

According to an aspect of the disclosure it is provided an apparatus for privacy protection in a data collection task. Said apparatus comprises means configured to receive encrypted data from a top participating node of a participant chain, which comprises a plurality of participating nodes; and means configured to decrypt the encrypted data, wherein the encrypted data comprise a plurality of encrypted sensory data obtained respectively by said plurality of participating nodes.

According to an embodiment, the apparatus further comprises means configured to select the top participating node and at least one child participating node for the participant chain based on inferable privacy level, data utility and/or expected incentive.

According to an embodiment, the apparatus further comprises means configured to obtain data utility for a candidate node through collaboration between a representative participating node and the candidate node.

According to an embodiment, the apparatus further comprises means configured to receive two intermediate values of data utility from the representative participating node and the candidate node; and means configured to recover the data utility for the candidate note based on the two intermediate values.

According to an embodiment, wherein the selecting means uses borda-count-based selection algorithm.

According to an embodiment, wherein each sensory data is associated with an encryption key and a unique random identification, and the apparatus further comprises means configured to determine a deserved incentive for each sensory data; means configured to encrypt the deserved incentive with a local second private key and the encryption key; means configured to send the combined encrypted data to a parent participating node of the participant chain, wherein the encrypted data comprise one or more encrypted sensory data.

According to an embodiment, wherein each sensory data is associated with a desired incentive, and the determining means further configured to determine the deserved incentive for each sensory data based on the desired incentive.

According to an embodiment, the apparatus further comprises means configured to send second public key corresponding to the local second private key to all the participating nodes when all the participating nodes have received their respective encrypted deserved incentives.

According to an embodiment, the apparatus further comprises means configured to detect a malicious participating node based on an alert message from a participating node not receiving its encrypted deserved incentive.

According to an embodiment, wherein the encrypted data further comprise encrypted identification information of each participating node sent respectively by said plurality of participating nodes and the encrypted identification information is not associated with the encrypted sensory data, and the apparatus further comprises means configured to detect a malicious participating node based on the identification information.

According to an embodiment, the apparatus further comprises means configured to evaluate the quality of sensory data based on majority vote method.

According to another aspect of the disclosure it is provided an apparatus for privacy protection in a data collection task. Said apparatus comprises means configured to receive encrypted data from a child participating node of a participant chain, which comprises a plurality of participating nodes; means configured to combine the encrypted data with corresponding local encrypted data; and means configured to send the combined encrypted data to a parent participating node of the participant chain, wherein the encrypted data comprise one or more encrypted sensory data.

According to an embodiment, the apparatus further comprises means configured to divide a first vector into first part and second part with an invertible matrix, wherein the first vector is related to sensory data that can be obtained by a representative participating node; means configured to send the second part to a candidate node; means configured to receive a third part of a second vector from the candidate node, wherein the second vector is related to sensory data that can be obtained by the candidate node; means configured to calculate first intermediate value of data utility based on the first part and the third part; and sending the first intermediate value to a task initiating node.

According to an embodiment, wherein each sensory data is associated with an encryption key and a unique random identification, the apparatus further comprises means configured to receive incentive information including an encrypted deserved incentive for each of at least one sensory data and its associated unique random identification from the parent participating node, wherein each deserved incentive is encrypted with the task initiating node's second private key and the encryption key; means configured to extract a local encrypted deserved incentive from the incentive information with a local unique random identification; and means configured to send the rest of the incentive information to the child participating node.

According to an embodiment, wherein each sensory data is associated with a desired incentive.

According to an embodiment, the apparatus further comprises means configured to send information about reception of encrypted deserved incentive to the task initiating node; means configured to receive second public key corresponding to the second private key from the task initiating node; and means configured to receive decrypt the local encrypted deserved incentive with the second public key and the decryption key corresponding to its associated encryption key.

According to an embodiment, the apparatus further comprises means configured to send an alert message to the task initiating node when fail to extract the local encrypted deserved incentive.

According to an embodiment, wherein the encrypted data further comprise encrypted identification information of a participating node sent by the participating node and the encrypted identification information is not associated with the encrypted sensory data.

According to another aspect of the disclosure it is provided an apparatus for privacy protection in a data collection task. Said apparatus comprises means configured to a second vector into third part and fourth part with an invertible matrix, wherein the second vector is related to sensory data that can be obtained by the apparatus; means configured to send the third part to a representative participating node; means configured to receive a second part of a first vector from the representative participating node, wherein the first vector is related to sensory data that can be obtained by a representative participating node; means configured to calculate second intermediate value of data utility based on the second part and the fourth part; and means configured to send the second intermediate value to a task initiating node.

According to an embodiment, the apparatus further comprises means configured to send the number of subtasks that can be performed by the candidate node and the total incentives requirement for the candidate node to the task initiating node.

It is noted that any of the components of the apparatus 200, 300, 400, 500 depicted in FIGS. 2-5 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The present disclosure has the following advantages: during the whole process of data uploading and incentive distribution, all encrypted data and the corresponding encrypted incentives are sent through the only direct communication between the AS and the top participating node. Thus the AS cannot associate each data/incentive with its provider/deserver. In data uploading, the appended $R_m''$ and $\mathcal{K}_m''$ of one encrypted data may be different from that of another encrypted data. That is to say, the AS cannot correlate multiple received data which belong to the same provider. From the perspective of $m \in X$, all the data or incentives transmitted among them is inaccessible due to the encryption. They only know the network addresses of their parent participating node and child participating node. It ensures the sequential uploading and distribution along with participants-chain and avoids skipping some of them. Moreover, other candidates who are not selected into X cannot join in the participants-chain. Therefore, the privacy among X is well protected against the spying of each other. Even if the malicious participants may counterfeit the sensory data for extra incentives, the majority voting evaluation will detect the malicious participants and no incentive will be distributed based on the counterfeited sensory data. The encryption of all the sensory data and incentives makes it impossible to distort others' sensory data as well as misappropriate others' incentives. Even if a malicious participant may discard the received sensory data and incentives from others, the AS can easily detect the malicious participant by verifying the integrity of decrypted identification information in data uploading, or checking the alert messages in incentives distribution. These detected malicious participants may rejected to join in any tasks for a predefined period or evermore, which can well propel the task-executing of participants based on their nature of benefit-tending and harm-avoiding.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method, comprising:
 receiving encrypted data from a child participating node of a participant chain, which comprises a plurality of participating nodes, and where the encrypted data comprises local encrypted data from sensory data from at least the child participating node;
 combining the encrypted data with corresponding local encrypted data from sensory data, wherein each sensory data is associated with a unique random identification, and wherein each sensory data is associated with an encryption key; and sending the combined encrypted data toward a parent participating node of the participant chain;

receiving, from the parent participating node, incentive information including an encrypted deserved incentive and an associated unique random identification for each of at least one sensory data, wherein each deserved incentive is encrypted with a task initiating node's private key and the encryption key;

extracting a local encrypted deserved incentive and a corresponding local unique random identification from the incentive information; and sending the rest of the incentive information to the child participating node.

2. The method according to claim 1, further comprising:

dividing a first vector into first part and second part with an invertible matrix, wherein the first vector is related to sensory data that can be obtained by a representative participating node;

sending the second part to a candidate node;

receiving a third part of a second vector from the candidate node, wherein the second vector is related to sensory data that can be obtained by the candidate node;

calculating a first intermediate value of data utility based on the first part and the third part; and sending the first intermediate value to the task initiating node.

3. An apparatus comprising:

at least one processor; and at least one memory including computer program code for one or more programs, the at least one memory and the computer program code configured to, with the at least one processor, cause the apparatus to perform at least the following:

receive encrypted data from a child participating node of a participant chain, which comprises a plurality of participating nodes, and where the encrypted data comprises local encrypted data from sensory data from at least the child participating node;

combine the encrypted data with corresponding local encrypted data from sensory data, wherein each sensory data is associated with a unique random identification, and wherein each sensory data is associated with an encryption key; and send the combined encrypted data toward a parent participating node of the participant chain;

receive, from the parent participating node, incentive information including an encrypted deserved incentive and an associated unique random identification for each of at least one sensory data, wherein each deserved incentive is encrypted with a task initiating node's private key and the encryption key;

extract a local encrypted deserved incentive and a corresponding local unique random identification from the incentive information; and send the rest of the incentive information to the child participating node.

4. The apparatus according to claim 3, wherein the at least one memory and the computer program code are configured to, with the at least one processor, cause the apparatus to:

divide a first vector into first part and second part with an invertible matrix, wherein the first vector is related to sensory data that can be obtained by a representative participating node;

send the second part to a candidate node; receive a third part of a second vector from the candidate node, wherein the second vector is related to sensory data that can be obtained by the candidate node;

calculate first intermediate value of data utility based on the first part and the third part; and send the first intermediate value to the task initiating node.

5. The apparatus according to claim 3, wherein each sensory data is associated with a desired incentive.

6. The apparatus according to claim 3, wherein the at least one memory and the computer program code are configured to, with the at least one processor, cause the apparatus to:

send information about reception of the encrypted deserved incentive to the task initiating node;

receive a public key corresponding to the private key from the task initiating node; and decrypt the local encrypted deserved incentive with the public key and a decryption key corresponding to its associated encryption key.

7. The method according to claim 1, wherein each sensory data is associated with a desired incentive.

8. The method according to claim 1, wherein method further comprises:

send information about reception of the encrypted deserved incentive to the task initiating node;

receive a public key corresponding to the private key from the task initiating node; and decrypt the local encrypted deserved incentive with the public key and a decryption key corresponding to its associated encryption key.

9. A non-transitory computer readable medium having stored thereon a set of computer readable instructions that, when executed by at least one processor, cause an apparatus to at least:

receive encrypted data from a child participating node of a participant chain, which comprises a plurality of participating nodes, and where the encrypted data comprises local encrypted data from sensory data from at least the child participating node;

combine the encrypted data with corresponding local encrypted data from sensory data, wherein each sensory data is associated with a unique random identification, and wherein each sensory data is associated with an encryption key; and send the combined encrypted data toward a parent participating node of the participant chain;

receive, from the parent participating node, incentive information including an encrypted deserved incentive and an associated unique random identification for each of at least one sensory data, wherein each deserved incentive is encrypted with a task initiating node's private key and the encryption key;

extract a local encrypted deserved incentive and a corresponding local unique random identification from the incentive information; and send the rest of the incentive information to the child participating node.

* * * * *